US010822502B2

(12) United States Patent
Eddy

(10) Patent No.: US 10,822,502 B2
(45) Date of Patent: Nov. 3, 2020

(54) ANTIMICROBIAL SOLUTION TO APPLY TO A HULL AND AN INTERIOR OF A BOAT

(71) Applicant: Parasol Medical, LLC, Buffalo Grove, IL (US)

(72) Inventor: Patrick E. Eddy, Allendale, MI (US)

(73) Assignee: Parasol Medical LLC, Buffalo Grove, IL (US)

( * ) Notice: Subject to any disclaimer, the term of this patent is extended or adjusted under 35 U.S.C. 154(b) by 57 days.

(21) Appl. No.: 16/277,793

(22) Filed: Feb. 15, 2019

(65) Prior Publication Data
US 2019/0276681 A1  Sep. 12, 2019

Related U.S. Application Data

(60) Provisional application No. 62/639,338, filed on Mar. 6, 2018.

(51) Int. Cl.
*B63B 59/04* (2006.01)
*C09D 7/20* (2018.01)
(Continued)

(52) U.S. Cl.
CPC ............ *C09D 5/1625* (2013.01); *B63B 59/04* (2013.01); *C09D 7/20* (2018.01); *C08K 5/544* (2013.01)

(58) Field of Classification Search
None
See application file for complete search history.

(56) References Cited

U.S. PATENT DOCUMENTS 4,372,303 A  2/1983 Grossmann et al.
4,797,420 A * 1/1989 Bryant .................. A01N 33/12
514/643
(Continued)

FOREIGN PATENT DOCUMENTS

WO  0054587 A1  9/2000
WO  0072850 A1  12/2000
(Continued)

OTHER PUBLICATIONS

European Commission, "Aerosol Dispensers Directive Evaluation—Background document", Sep. 23, 2016, Directorate-General for Internal Market, Industry, Entrepreneurship and SMEs, Belgium (1 page).
(Continued)

*Primary Examiner* — Peter A Salamon
(74) *Attorney, Agent, or Firm* — Price Heneveld LLP

(57) ABSTRACT

A boat comprises: an external surface; an antimicrobial coating applied to at least a portion of the external surface comprising a silane quaternary ammonium ion or salt thereof. The silane quaternary ammonium ion or salt thereof is one or more of: 3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, or 3-(trihydroxysilyl)propyldimethyloctadecyl ammonium chloride. The external surface can be a hull configured to contact water, wherein, the external surface is located at the hull. The external surface can be an interior configured to accommodate one or more passengers. The boat can further include an interior configured to accommodate one or more passengers, and the external surface can be a carpet at least partially covering a floor portion of the interior. The antimicrobial coating inhib-
(Continued)

its the growth of algae, mold, and mildew on the external surface to which the antimicrobial coating is applied.

18 Claims, 5 Drawing Sheets

(51) Int. Cl.
*C08K 5/544* (2006.01)
*C09D 5/16* (2006.01)

(56) References Cited

U.S. PATENT DOCUMENTS

| | | | |
|---|---|---|---|
| 4,865,844 | A | 9/1989 | Blank et al. |
| 4,921,691 | A | 5/1990 | Stockel |
| 5,079,004 | A | 1/1992 | Blank et al. |
| 5,183,664 | A | 2/1993 | Ansell |
| 5,270,358 | A | 12/1993 | Asmus |
| 5,411,585 | A * | 5/1995 | Avery .................... A01N 55/00 106/287.1 |
| 5,428,078 | A | 6/1995 | Cohen et al. |
| 5,762,623 | A | 6/1998 | Murphy et al. |
| 5,954,869 | A | 9/1999 | Elfersy et al. |
| 5,959,014 | A * | 9/1999 | Liebeskind ............... C09D 4/00 524/389 |
| 6,224,579 | B1 | 5/2001 | Modak et al. |
| 6,495,229 | B1 | 12/2002 | Carte et al. |
| 6,821,943 | B2 | 11/2004 | Avery et al. |
| 6,994,890 | B2 * | 2/2006 | Ohlhausen ............... C09D 4/00 106/2 |
| 7,045,673 | B1 | 5/2006 | Batich et al. |
| 7,704,313 | B2 * | 4/2010 | Ohlhausen ........... C09D 183/08 106/287.11 |
| 7,709,694 | B2 | 5/2010 | Batich et al. |
| 7,754,004 | B2 * | 7/2010 | Ohlhausen ........... C09D 183/08 106/287.11 |
| 7,790,217 | B2 | 9/2010 | Toreki et al. |
| 8,025,120 | B2 | 9/2011 | Eddy |
| 8,257,780 | B2 | 9/2012 | Ohlhausen et al. |
| 8,440,217 | B1 | 5/2013 | El-Naggar et al. |
| 8,491,922 | B2 | 7/2013 | Eddy |
| 8,639,527 | B2 | 1/2014 | Rensvold et al. |
| 8,679,526 | B2 | 3/2014 | Van Den Plas et al. |
| 9,028,846 | B2 | 5/2015 | Eddy |
| 9,433,708 | B2 | 9/2016 | Eddy |
| 9,675,735 | B2 | 6/2017 | Eddy |
| 9,717,249 | B2 | 8/2017 | Eddy |
| 2002/0111282 | A1 * | 8/2002 | Charaf .................. A01N 43/08 510/130 |
| 2007/0021383 | A1 | 1/2007 | Loder |
| 2007/0042198 | A1 | 2/2007 | Schonemyr et al. |
| 2007/0218096 | A1 | 9/2007 | Wooley |
| 2008/0260804 | A1 | 10/2008 | Morris et al. |
| 2009/0215917 | A1 | 8/2009 | Trotter et al. |
| 2009/0223411 | A1 * | 9/2009 | Higgins ................ D06M 13/17 106/287.1 |
| 2009/0252647 | A1 * | 10/2009 | Orofino .................... A61L 2/18 422/28 |
| 2009/0312684 | A1 | 12/2009 | Leonard et al. |
| 2010/0028462 | A1 | 2/2010 | Bolkan et al. |
| 2010/0167978 | A1 | 7/2010 | Iyer et al. |
| 2010/0331710 | A1 | 12/2010 | Eddy |
| 2011/0200655 | A1 | 8/2011 | Black et al. |
| 2011/0233810 | A1 | 9/2011 | Neigel et al. |
| 2011/0271873 | A1 * | 11/2011 | Ohlhausen ............... C09D 4/00 106/287.11 |
| 2012/0173274 | A1 | 7/2012 | Rensvold et al. |
| 2013/0101677 | A1 | 4/2013 | Callahan et al. |
| 2013/0231599 | A1 | 9/2013 | Eddy |
| 2013/0273132 | A1 * | 10/2013 | Eddy ..................... A01N 55/00 424/411 |
| 2013/0345170 | A1 | 12/2013 | Eddy |
| 2014/0051732 | A1 * | 2/2014 | Ghannoum ........... A01N 43/40 514/358 |
| 2014/0100504 | A1 | 4/2014 | Eddy |
| 2014/0271794 | A1 | 9/2014 | Eddy |
| 2016/0143275 | A1 | 5/2016 | Lan et al. |
| 2016/0143276 | A1 * | 5/2016 | Lan ........................ A01N 33/12 424/411 |
| 2016/0262382 | A1 | 9/2016 | Lan et al. |
| 2016/0262383 | A1 | 9/2016 | Lan et al. |
| 2017/0280716 | A1 | 10/2017 | Lan et al. |
| 2019/0276681 | A1 * | 9/2019 | Eddy ........................ C09D 7/20 |

FOREIGN PATENT DOCUMENTS

| | | |
|---|---|---|
| WO | 2005042657 A2 | 5/2005 |
| WO | 2007061625 A2 | 5/2007 |
| WO | 2007076413 A2 | 7/2007 |
| WO | 2008076839 A2 | 6/2008 |
| WO | 2008097599 A2 | 8/2008 |
| WO | 2013102021 A2 | 7/2013 |

OTHER PUBLICATIONS

Monticello, Robert A., "The Use of Reactive Silane Chemistries to Provide Durable, Non-Leaching Antimicrobial Surfaces", AEGIS Environments, Midland, Michigan USA, Jan. 1, 2010 (77 pages).
AEGIS Environments, Material Safety Data Sheet AEGIS Microbe Shield(TM) Program—AEGIS(TM) Antimicrobial (Typical Application Strength), Midland, Michigan USA, May 12, 2004 (5 pages).
Anonymous, 2009, SiSiB PC9911 Antimicrobial, Power Chemical Corp, [online]; downloaded from URL<http://www.powerchemcorp.com/library/public/SiSiB_PC9911.pdf>on Oct. 8, 2013; 2 pages.
Murray et al., "Microbial Inhibition on Hospital Garments Treated with Dow Corning 5700 Antimicrobial Agent," Journal of Clinical Microbiology, vol. 26, No. 9, Sep. 1988, pp. 1884-1886.
Rutala et al., "Guideline for Disinfection and Sterilization in Healthcare Facilities, 2008," Centers for Disease Control (CDC), Department of Health & Human Services, Feb. 15, 2017 (161 pages).
U.S. Food & Drug Administration (FDA), "Reprocessing Medical Devices in Health Care Settings: Validation Methods and Labeling Guidance for Industry and Food and Drug Administration Staff," Mar. 17, 2015 (44 pages).

\* cited by examiner

ANTIMICROBIAL SOLUTION TO APPLY TO A HULL AND AN INTERIOR OF A BOAT

CROSS-REFERENCE TO RELATED APPLICATION

This patent application claims, pursuant to 35 U.S.C. § 119(e), priority to and the benefit of U.S. Provisional Patent Application No. 62/639,338, entitled "ANTIMICROBIAL SOLUTION TO APPLY TO A HULL AND AN INTERIOR OF A BOAT," filed on Mar. 6, 2018, the entire disclosure of which is incorporated herein by reference.

BACKGROUND OF THE INVENTION

A boat is subject to a wet environment. The hull of a boat, often in contact with water for long periods of time, is prone to develop a coating of algae. Removal of the algae is an arduous process. The interior of the boat similarly contacts water, which if not removed, can lead to the growth of mold and/or mildew.

BRIEF SUMMARY OF THE INVENTION

According to a first aspect of the present disclosure, a boat comprises: an external surface; an antimicrobial coating applied to at least a portion of the external surface comprising a silane quaternary ammonium ion or salt thereof.

Embodiments of the first aspect of the invention can include any one or a combination of the following features:
- the silane quaternary ammonium ion or salt is 3-(trimethoxysilyl)propyldimethyloctadecyl ammonium ion or 3-(trimethoxysilyl)propyldimethyloctadecyl ammonium chloride, respectively;
- the silane quaternary ammonium ion or salt is 3-(trihydroxysilyl)propyldimethyloctadecyl ammonium ion or 3-(trihydroxysilyl)propyldimethyloctadecyl ammonium chloride, respectively;
- a hull configured to contact water, wherein, the external surface is located at the hull;
- an interior configured to accommodate one or more passengers;
- the interior includes a floor portion at least partially covered with a carpet, wherein, the external surface is the carpet;
- the interior includes one or more seating assemblies configured to support the one or more passengers, and the seating assemblies including trim, wherein, the external surface is the trim; and
- the interior includes one or more storage areas, wherein, the external surface is in the storage area.

According to a second aspect of the present disclosure, a method of inhibiting growth of algae on a hull of a boat comprises: presenting the hull of the boat, the hull having an external surface configured to contact water; and applying, to the external surface of the hull, a solution including a silane quaternary ammonium ion or salt thereof.

Embodiments of the second aspect of the invention can include any one or a combination of the following features:
- the silane quaternary ammonium ion or salt thereof is one or more of: 3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, or 3-(trihydroxysilyl)propyldimethyloctadecyl ammonium chloride;
- the solution further includes isopropyl alcohol;
- the silane quaternary ammonium ion or salt thereof is between 0.1 percent and 10 percent by weight of the solution; and
- the isopropyl alcohol is between 30 percent to 90 percent by weight of the solution.

According to a third aspect of the present disclosure, a method of inhibiting growth of mold or mildew in an interior of a boat comprises: presenting the interior of the boat, the interior having an external surface; and applying, to the external surface of the interior, a solution including a silane quaternary ammonium ion or salt thereof.

Embodiments of the third aspect of the invention can include any one or a combination of the following features:
- the silane quaternary ammonium ion or salt thereof is one or more of: 3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, or 3-(trihydroxysilyl)propyldimethyloctadecyl ammonium chloride;
- the solution further includes isopropyl alcohol and the isopropyl alcohol is between 30 percent to 90 percent by weight of the solution; and
- the silane quaternary ammonium ion or salt thereof is between 0.1 percent and 10 percent by weight of the solution.

These and other features, advantages, and objects of the present invention will be further understood and appreciated by those skilled in the art by reference to the following specification, claims, and appended drawings.

DETAILED DESCRIPTION

Figure 1:
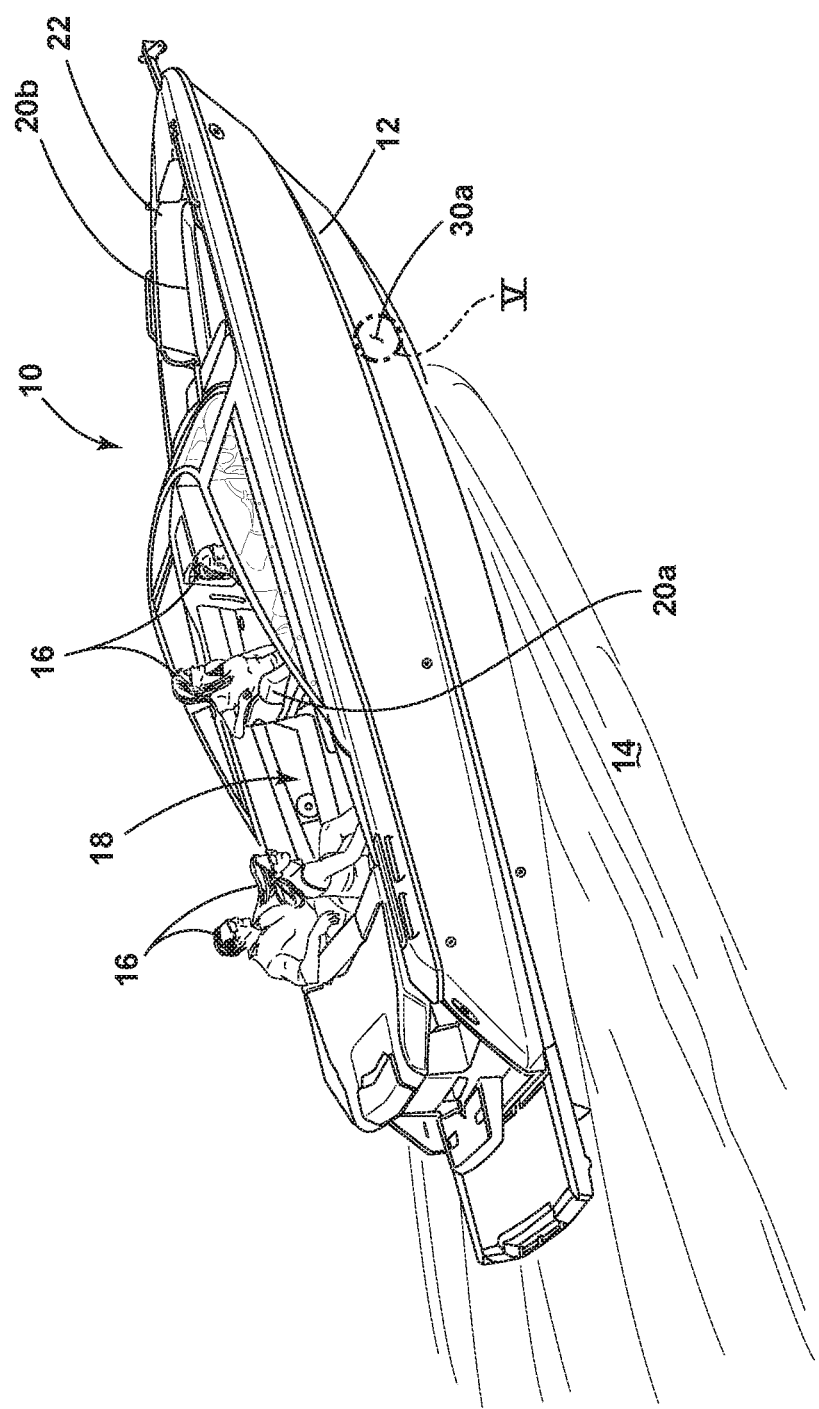
FIG. 1 is a perspective view of a boat, illustrating a hull configured to contact water and passengers being transported over the water.
Figure 2:
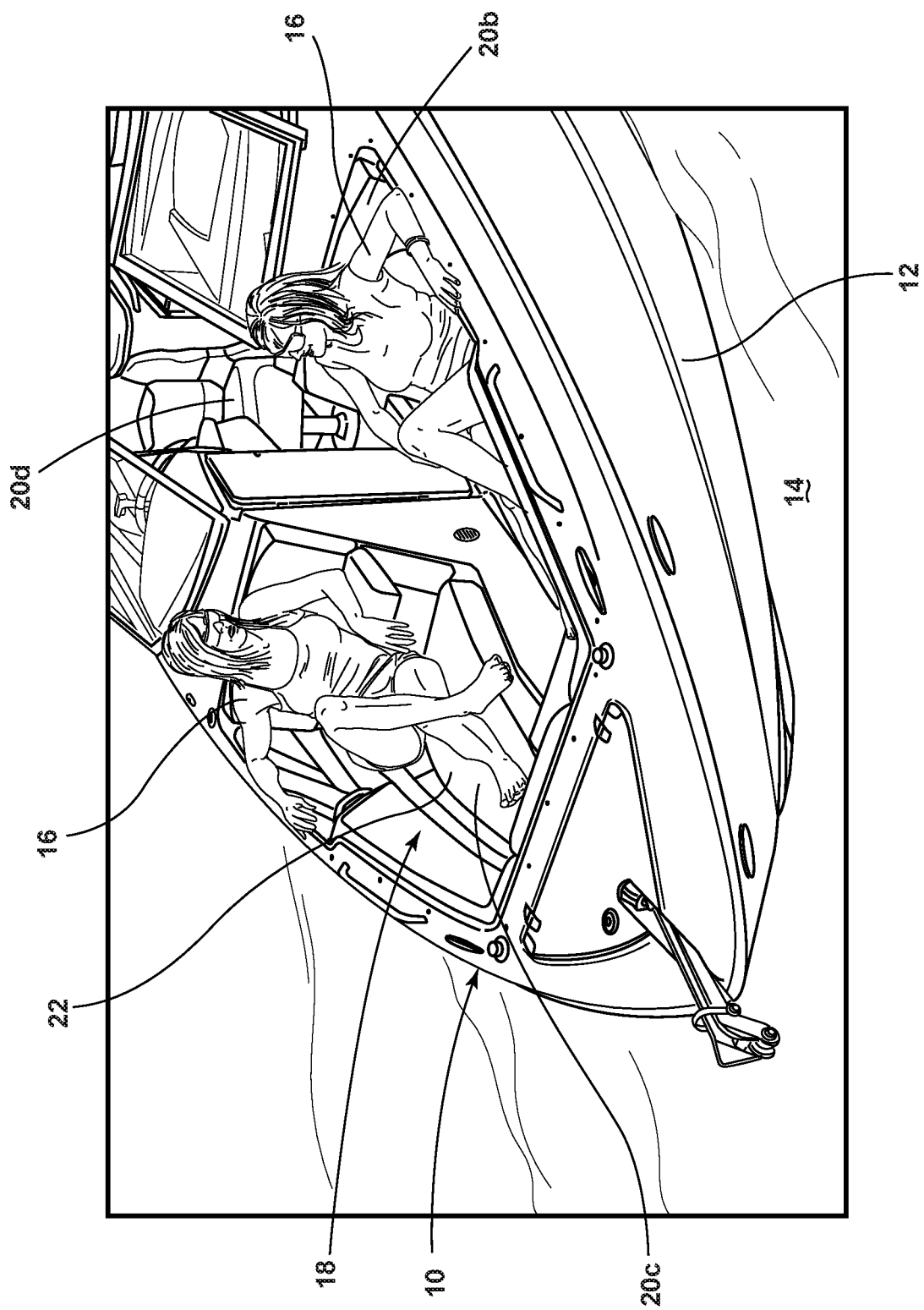
FIG. 2 is a perspective view of the boat of FIG. 1, illustrating several passengers in an interior of the boat, sitting on seating assemblies.
Figure 3:
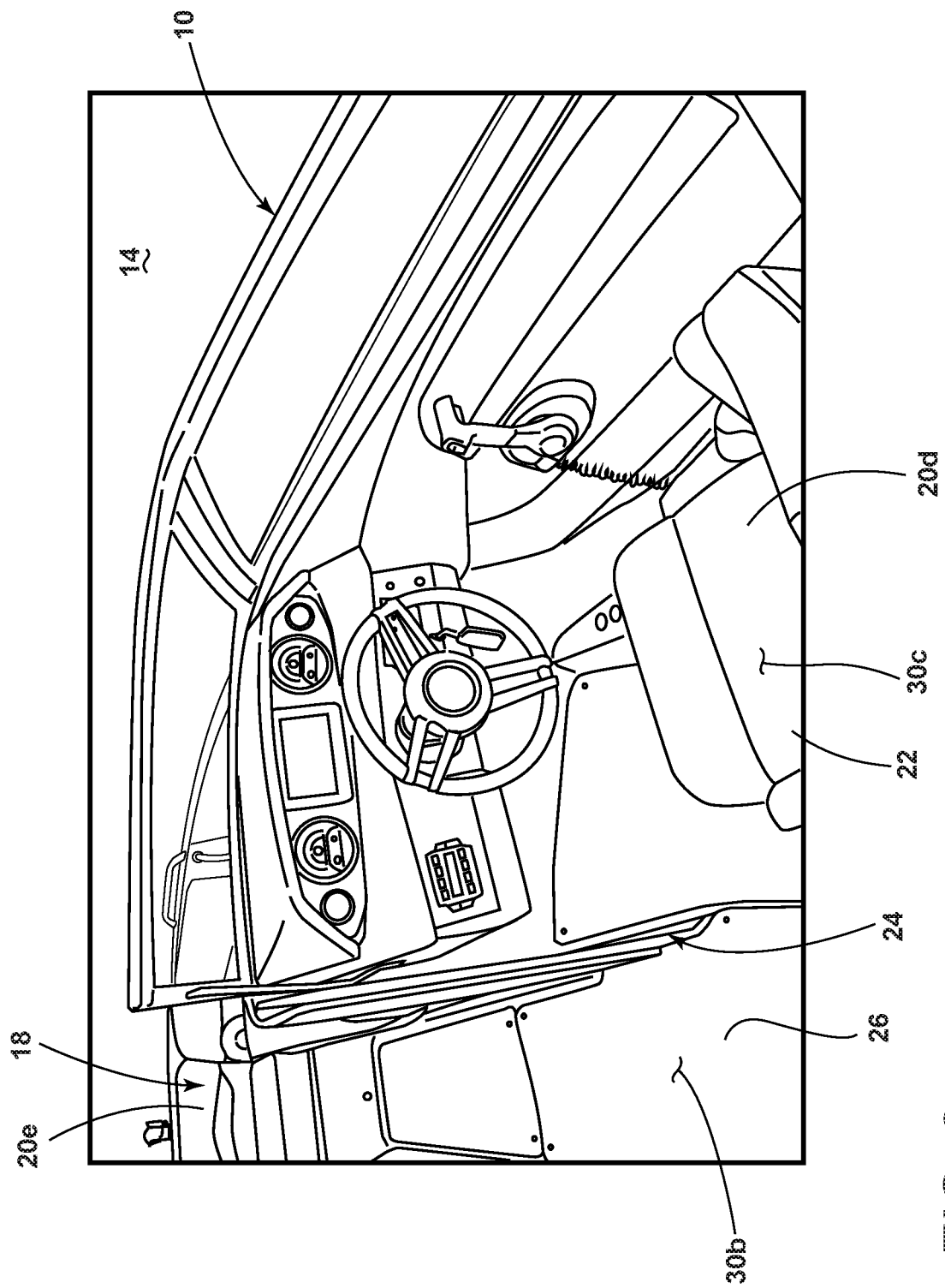
FIG. 3 is a perspective view the interior of the boat of FIG. 1, illustrating a floor portion partially covered by carpet, which has an external surface.
Figure 4:
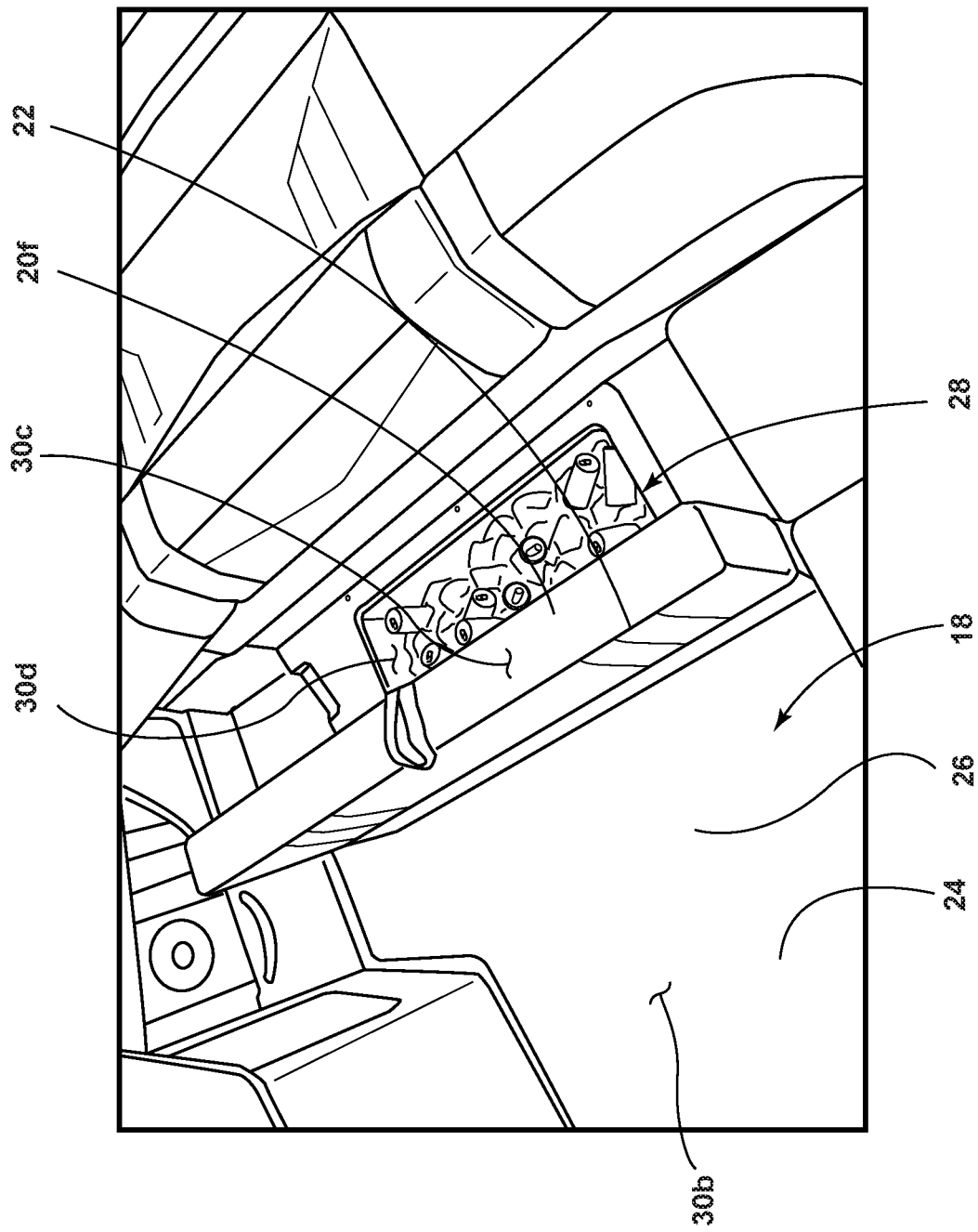
FIG. 4 is a perspective view of the interior of the boat of FIG. 1, illustrating a storage area, which has an external surface.

For purposes of description herein, it is to be understood that the specific devices and processes illustrated in the attached drawings, and described in the following specification are simply exemplary embodiments of the inventive concepts defined in the appended claims. Hence, physical characteristics relating to the embodiments disclosed herein are not to be considered as limiting, unless the claims expressly state otherwise.

Referring to FIGS. 1-4, a boat 10 includes a hull 12. The hull 12 is configured to contact water 14, including to float and to displace the water 14, to enable transportation of one or more passengers 16 over the water 14. The boat 10 further includes an interior 18. The interior 18 is configured to accommodate the one or more passengers 16. For example, the interior 18 includes one or more seating assemblies 20 (such as, seating assemblies 20a-20f) to support the one or more passengers 16. The seating assemblies 20 can include trim 22, which is typically a fabric (such as vinyl) covering padding. The interior 18 further includes a floor portion 24 (see FIG. 3). A carpet 26 at least partially covers the floor portion 24. The interior 18 further includes one or more storage areas 28 (see FIG. 4). The storage area 28 can be housed under one of the seating assemblies 20, such as here seating assembly 20f. The storage area 28 can be a live well, act as a food and beverage cooler, store marine safety equipment, among other things, including storage areas that may contact water or contain damp items. The boat 10 thus includes a variety of external surfaces 30, which may be prone to the growth of algae, mold, and/or mildew, including an external surface 30a of the hull 12 (see FIG. 1), an external surface 30b provided by the carpet 26 (see FIG. 3), an external surface 30c provided by the trim 22, and an external surface 30d within the storage area 28 (see FIG. 4).

Figure 5:
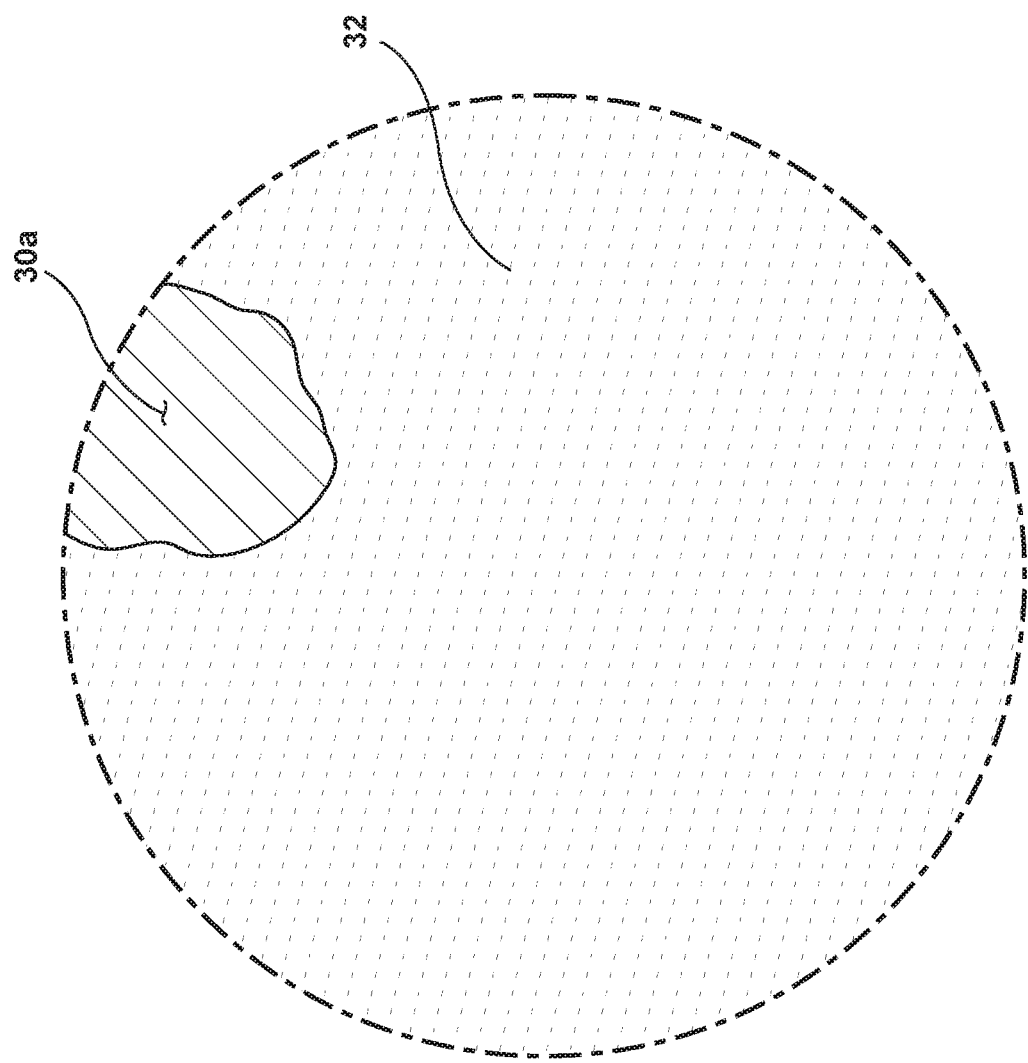
FIG. 5 is a schematic diagram representing area V of FIG. 1, illustrating an antimicrobial coating applied over an external surface of the hull, which antimicrobial coating inhibits the growth of algae on the external surface of the hull.

Referring now to FIG. 5, the boat 10 further includes an antimicrobial coating 32 applied to at least a portion of the external surface 30, such as one of the external surfaces 30a-30d specifically mentioned above. The antimicrobial coating 32 includes a silane quaternary ammonium ion or salt thereof. Among the preferable silane quaternary ammonium ions or salts thereof include 3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, and 3-(trihydroxysilyl)propyldimethyloctadecyl ammonium chloride. FIG. 5 specifically illustrates the antimicrobial coating 32 applied over the external surface 30a of the hull 12, but it should be understood that the antimicrobial coating 32 can be applied over any external surface 30 of the boat 10, including those external surfaces 30b-30d described above.

The antimicrobial coating 32 can be applied to the external surface 30 of the boat, in the form of a solution. In addition to the silane quaternary ammonium ion or salt thereof, the solution can further include a solvent. A preferred solvent is isopropyl alcohol.

The silane quaternary ammonium ion or salt thereof can comprise between 0.1 percent and 10 percent by weight of the solution. More preferably, the silane quaternary ammonium ion or salt thereof can comprise between 0.75 percent and 5 percent by weight of the solution. Even more preferably, the silane quaternary ammonium ion or salt thereof can comprise between 1.9 percent and 2.1 percent by weight of the solution.

As for the isopropyl alcohol, the isopropyl alcohol can comprise between 30 percent to 90 percent by weight of the solution. More preferably, the isopropyl alcohol can comprise between 55 percent and 65 percent by weight of the solution. An example preferable solution comprises (by weight) 60.0 percent isopropyl alcohol, 2.02 percent 3-(trimethoxysilyl)propyldimethyloctadecyl ammonium chloride, and 34.19 percent deionized water.

Applying the solution to the external surface 30 of the boat 10 can be part of a novel method of inhibiting the growth of algae on the hull 12 of the boat 10. The novel method of inhibiting the growth of algae on the hull 12 of the boat 10 comprises presenting the hull 12 of the boat 10 (the hull 12 having the external surface 30a) and applying, to the external surface 30 of the hull 12, the solution described above including the silane quaternary ion or salt thereof. Applying the solution forms the antimicrobial coating 32 over the external surface 30 of the hull 12 and inhibits the growth of algae on the hull 12.

In addition, applying the solution to the external surface 30 of the boat 10 can be part of a novel method of inhibiting the growth of mold or mildew in the interior 18 of the boat 10. The novel method of inhibiting the growth of mold or mildew in the interior 18 of the boat 10 comprises presenting the interior 18 of the boat 10 (the interior 18 having the external surface 30, such as one of the external surfaces 30b-d specified above), and applying, to the external surface 30 of the interior 18, the solution described above including the silane quaternary ion or salt thereof. Applying the solution forms the antimicrobial coating 32 over the external surface 30 of the hull 12 and inhibits the growth of mold and mildew in the interior 18 of the boat 10.

The solution can be applied via spraying the solution containing the silane quaternary ammonium ion or salt thereof and the solvent with an electrostatic sprayer. Alternatively, the solution can be applied with a wipe soaked with the solvent, a spray bottle containing the solvent, and other means. The solvent of the solution generally evaporates, leaving the antimicrobial coating 32 with the silane quaternary ion or salt thereon, which imparts the algae-inhibiting and mold/mildew-inhibiting properties to the external surface 30 to which the antimicrobial coating 32 is applied.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A boat comprising:
   an external surface; and
   an antimicrobial coating applied to at least a portion of the external surface, the antimicrobial coating comprising:
   isopropyl alcohol; and
   a silane quaternary ammonium ion or salt thereof;
   wherein, the silane quaternary ammonium ion or salt thereof is one or more of:
   3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, or 3-(trihydroxysilyl)propyldimethyloctadecyl ammonium chloride.

2. The boat of claim 1,
   wherein, the silane quaternary ammonium ion or salt is 3-(trimethoxysilyl)propyldimethyloctadecyl ammonium ion or 3-(trimethoxysilyl)propyldimethyloctadecyl ammonium chloride, respectively.

3. The boat of claim 1,
   wherein, the silane quaternary ammonium ion or salt is 3-(trihydroxysilyl)propyldimethyloctadecyl ammonium ion or 3-(trihydroxysilyl)propyldimethyloctadecyl ammonium chloride, respectively.

4. The boat of claim 2 further comprising:
   a hull configured to contact water;
   wherein, the external surface is located at the hull.

5. The boat of claim 3 further comprising:
   a hull configured to contact water;
   wherein, the external surface is located at the hull.

6. The boat of claim 2 further comprising:
   an interior configured to accommodate one or more passengers;
   the interior including a floor portion at least partially covered with a carpet;
   wherein, the external surface is the carpet.

7. The boat of claim 3 further comprising:
an interior configured to accommodate one or more passengers;
the interior including a floor portion at least partially covered with a carpet;
wherein, the external surface is the carpet.

8. The boat of claim 2 further comprising:
an interior configured to accommodate one or more passengers;
the interior including one or more seating assemblies configured to support the one or more passengers, and the seating assemblies including trim;
wherein, the external surface is the trim.

9. The boat of claim 3 further comprising:
an interior configured to accommodate one or more passengers;
the interior including one or more seating assemblies configured to support the one or more passengers, and the seating assemblies including trim;
wherein, the external surface is the trim.

10. The boat of claim 2 further comprising:
an interior configured to accommodate one or more passengers;
the interior including one or more storage areas;
wherein, the external surface is in the storage area.

11. The boat of claim 3 further comprising:
an interior configured to accommodate one or more passengers;
the interior including one or more storage areas;
wherein, the external surface is in the storage area.

12. A method of inhibiting growth of algae on a hull of a boat comprising:
applying, to an external surface of a hull of a boat that is configured to contact water, a solution comprising: (i) isopropyl alcohol; and (ii) a silane quaternary ammonium ion or salt thereof, wherein the silane quaternary ammonium ion or salt thereof is one or more of: 3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, or 3-(trihydroxysilyl)propyldimethyloctadecyl ammonium chloride.

13. The method of claim 12,
wherein, the silane quaternary ammonium ion or salt thereof is between 0.1 percent and 10 percent by weight of the solution.

14. The method of claim 12
wherein, the isopropyl alcohol is between 30 percent to 90 percent by weight of the solution.

15. A method of inhibiting growth of mold or mildew in an interior of a boat comprising:
applying, to an external surface of an interior of a boat, a solution comprising: (i) 30 percent to 90 percent by weight isopropyl alcohol; and (ii) a silane quaternary ammonium ion or salt thereof, wherein, the silane quaternary ammonium ion or salt thereof is one or more of: 3-(trimethoxysilyl)propyldimethyloctadecyl ammonium ion, 3-(trimethoxysilyl)propyldimethyloctadecyl ammonium chloride, 3-(trihydroxysilyl)propyldimethyloctadecyl ammonium ion, or 3-(trihydroxysilyl)propyldimethyloctadecyl ammonium chloride.

16. The method of claim 15,
wherein, the silane quaternary ammonium ion or salt thereof is between 0.1 percent and 10 percent by weight of the solution.

17. The method of claim 15, wherein the external surface is a carpet at a floor portion of the interior.

18. The method of claim 15, wherein the external surface is trim of a seating assembly configured to support a passenger.

* * * * *